(12) United States Patent
Rust

(10) Patent No.: US 7,336,524 B2
(45) Date of Patent: Feb. 26, 2008

(54) ATOMIC PROBES AND MEDIA FOR HIGH DENSITY DATA STORAGE

(75) Inventor: Thomas F. Rust, Oakland, CA (US)

(73) Assignee: Nanochip, Inc., Fremont, CA (US)

( * ) Notice: Subject to any disclaimer, the term of this patent is extended or adjusted under 35 U.S.C. 154(b) by 0 days.

(21) Appl. No.: 11/321,136

(22) Filed: Dec. 29, 2005

(65) Prior Publication Data

US 2006/0120140 A1    Jun. 8, 2006

Related U.S. Application Data

(63) Continuation of application No. 10/684,661, filed on Oct. 14, 2003, now Pat. No. 7,233,517.

(60) Provisional application No. 60/418,923, filed on Oct. 15, 2002.

(51) Int. Cl.
*G11C 11/00* (2006.01)

(52) U.S. Cl. ...................... 365/151; 365/174

(58) Field of Classification Search ................. 365/151, 365/174
See application file for complete search history.

(56) References Cited

U.S. PATENT DOCUMENTS

| 4,300,350 A | 11/1981 | Becker ........................ 60/528 |
| 4,340,953 A | 7/1982 | Iwamura et al. ............ 369/126 |
| 4,575,822 A | 3/1986 | Quate ........................ 365/174 |
| 4,710,899 A | 12/1987 | Young et al. ............... 365/113 |
| 4,719,594 A | 1/1988 | Young et al. ............... 365/113 |
| 4,737,934 A | 4/1988 | Ross et al. .................. 365/106 |
| 4,744,055 A | 5/1988 | Hennessey ................. 365/113 |
| 4,769,338 A | 9/1988 | Ovshinsky .................. 437/39 |
| 4,769,682 A | 9/1988 | Yang et al. .................... 357/2 |
| 4,775,425 A | 10/1988 | Guha et al. ................. 136/249 |
| 4,792,501 A | 12/1988 | Allred et al. ............... 428/699 |
| 4,820,394 A | 4/1989 | Young et al. .......... 204/192.21 |
| 4,829,507 A | 5/1989 | Kazan et al. ............... 369/126 |

(Continued)

FOREIGN PATENT DOCUMENTS

EP     0 438 256 B1     7/1991

(Continued)

OTHER PUBLICATIONS

Bo Hong, Exploring the Usage of MEMS-based Storage as Metadata Storage and Disk Cache in Storage Hierarchy, Storage Systems Research Center, Jack Baskin School of Engineering, University of California at Santa Cruz, http://www.cse.ucsc.edu/~hongbo/publications/mems-metadata.pdf.

(Continued)

*Primary Examiner*—Viet Q. Nguyen
(74) *Attorney, Agent, or Firm*—Fliesler Meyer LLP

(57) ABSTRACT

A device in accordance with embodiments of the present invention comprises a contact probe for high density data storage reading, writing, erasing, or rewriting. In one embodiment, the contact probe can include a silicon core having a conductive coating. Contact probes in accordance with the present invention can be applied to a phase change media, for example, to form an indicia in the phase change media by changing the electrical resistivity of a portion of the phase change media.

4 Claims, 10 Drawing Sheets

U.S. PATENT DOCUMENTS

| | | | | |
|---|---|---|---|---|
| 4,831,614 | A | 5/1989 | Duerig et al. | 369/101 |
| 4,843,443 | A | 6/1989 | Ovshinsky et al. | 357/23.7 |
| 4,845,533 | A | 7/1989 | Pryor et al. | 357/2 |
| 4,868,616 | A | 9/1989 | Johnson et al. | 357/17 |
| 4,876,667 | A | 10/1989 | Ross et al. | 365/113 |
| 4,882,295 | A | 11/1989 | Czubatyj et al. | 437/101 |
| 4,883,686 | A | 11/1989 | Doehler et al. | 427/38 |
| 4,891,330 | A | 1/1990 | Guha et al. | 437/81 |
| 4,916,002 | A | 4/1990 | Carver | 428/139 |
| 4,916,688 | A | 4/1990 | Foster et al. | 369/126 |
| 4,924,436 | A | 5/1990 | Strand | 365/113 |
| 4,943,719 | A | 7/1990 | Akamine et al. | 250/306 |
| 4,945,515 | A | 7/1990 | Ooumi et al. | 365/174 |
| 4,962,480 | A | 10/1990 | Ooumi et al. | 365/151 |
| 4,968,585 | A | 11/1990 | Albrecht et al. | 430/320 |
| 4,987,312 | A | 1/1991 | Eigler | 250/492.3 |
| 5,008,617 | A | 4/1991 | Czubatyj et al. | 324/158 |
| 5,038,322 | A | 8/1991 | Van Loenen | 365/114 |
| 5,043,577 | A | 8/1991 | Pohl et al. | 250/306 |
| 5,043,578 | A | 8/1991 | Guthner et al. | 250/307 |
| 5,051,977 | A | 9/1991 | Goldberg | 369/126 |
| 5,091,880 | A | 2/1992 | Isono et al. | 365/151 |
| 5,095,479 | A | 3/1992 | Harigaya et al. | 369/288 |
| 5,097,443 | A | 3/1992 | Kaneko et al. | 357/153 |
| 5,103,284 | A | 4/1992 | Ovshinsky et al. | 357/60 |
| 5,126,635 | A | 6/1992 | Doehler et al. | 315/111.21 |
| 5,128,099 | A | 7/1992 | Strand et al. | 420/579 |
| 5,132,934 | A | 7/1992 | Quate et al. | 369/126 |
| 5,144,148 | A | 9/1992 | Eigler | 250/492.3 |
| 5,144,581 | A | 9/1992 | Toda et al. | 369/126 |
| 5,159,661 | A | 10/1992 | Ovshinsky et al. | 395/24 |
| 5,166,758 | A | 11/1992 | Ovshinsky et al. | 257/3 |
| 5,166,919 | A | 11/1992 | Eigler | 369/126 |
| 5,177,567 | A | 1/1993 | Klersy et al. | 257/4 |
| 5,180,686 | A | 1/1993 | Banerjee et al. | 437/181 |
| 5,180,690 | A | 1/1993 | Czubatyj et al. | 437/233 |
| 5,182,724 | A | 1/1993 | Yanagisawa et al. | 365/151 |
| 5,187,367 | A | 2/1993 | Miyazaki et al. | 250/306 |
| 5,196,701 | A | 3/1993 | Foster et al. | 250/306 |
| 5,210,714 | A | 5/1993 | Pohl et al. | 365/157 |
| 5,216,631 | A | 6/1993 | Sliwa, Jr. | 365/174 |
| 5,222,060 | A | 6/1993 | Kuroda et al. | 369/126 |
| 5,223,308 | A | 6/1993 | Doehler | 427/575 |
| 5,231,047 | A | 7/1993 | Ovshinsky et al. | 437/101 |
| 5,251,200 | A | 10/1993 | Hatanaka et al. | 369/126 |
| 5,260,567 | A | 11/1993 | Kuroda et al. | 250/227.19 |
| 5,262,981 | A | 11/1993 | Rabe et al. | 365/120 |
| 5,264,876 | A | 11/1993 | Kawade et al. | 346/153.1 |
| 5,265,046 | A | 11/1993 | Fuchs et al. | 365/153.1 |
| 5,268,571 | A | 12/1993 | Yamamoto et al. | 250/306 |
| 5,288,999 | A * | 2/1994 | Betzig et al. | 250/227.26 |
| 5,289,455 | A | 2/1994 | Kuroda et al. | 369/126 |
| 5,296,716 | A | 3/1994 | Ovshinsky et al. | 257/3 |
| 5,307,311 | A | 4/1994 | Sliwa, Jr. | 365/174 |
| 5,323,375 | A | 6/1994 | Ihara et al. | 369/126 |
| 5,324,553 | A | 6/1994 | Ovshinsky et al. | 427/571 |
| 5,329,122 | A | 7/1994 | Sakai et al. | 250/306 |
| 5,329,514 | A | 7/1994 | Eguchi et al. | 369/126 |
| 5,330,630 | A | 7/1994 | Klersy et al. | 204/192.05 |
| 5,331,589 | A | 7/1994 | Gambino et al. | 365/151 |
| 5,335,197 | A | 8/1994 | Kaneko et al. | 365/153 |
| 5,341,328 | A | 8/1994 | Ovshinsky et al. | 365/163 |
| 5,343,042 | A | 8/1994 | Fuchs et al. | 250/307 |
| 5,359,205 | A | 10/1994 | Ovshinsky et al. | 257/3 |
| 5,373,494 | A | 12/1994 | Kawagishi et al. | 369/126 |
| 5,389,475 | A | 2/1995 | Yanagisawa et al. | 430/19 |
| 5,390,161 | A | 2/1995 | Kurihara et al. | 369/126 |
| 5,396,453 | A | 3/1995 | Kawada et al. | 365/151 |
| 5,396,483 | A | 3/1995 | Matsuda et al. | 369/283 |
| 5,398,229 | A | 3/1995 | Nakayama et al. | 369/126 |
| 5,406,509 | A | 4/1995 | Ovshinsky et al. | 365/113 |
| 5,411,591 | A | 5/1995 | Izu et al. | 118/718 |
| 5,412,597 | A | 5/1995 | Miyazaki et al. | 365/174 |
| 5,414,271 | A | 5/1995 | Ovshinsky et al. | 257/3 |
| 5,416,331 | A | 5/1995 | Ichikawa et al. | 250/492.2 |
| 5,426,092 | A | 6/1995 | Ovshinsky et al. | 505/461 |
| 5,432,771 | A | 7/1995 | Shido et al. | 369/126 |
| 5,439,777 | A | 8/1995 | Kawada et al. | 430/270 |
| 5,444,191 | A | 8/1995 | Yamamoto et al. | 178/18.01 |
| 5,446,684 | A | 8/1995 | Kaneko et al. | 365/46 |
| 5,453,970 | A | 9/1995 | Rust et al. | 369/176 |
| 5,471,064 | A | 11/1995 | Koyanagi et al. | 250/452.2 |
| 5,471,458 | A | 11/1995 | Oguchi et al. | 369/126 |
| 5,481,528 | A | 1/1996 | Eguchi et al. | 369/126 |
| 5,526,334 | A | 6/1996 | Yamano et al. | 369/53 |
| 5,534,711 | A | 7/1996 | Ovshinsky et al. | 257/3 |
| 5,534,712 | A | 7/1996 | Ovshinsky et al. | 217/3 |
| 5,536,947 | A | 7/1996 | Klersky et al. | 257/3 |
| 5,537,372 | A | 7/1996 | Albrecht et al. | 369/43 |
| 5,543,737 | A | 8/1996 | Ovshinsky et al. | 326/104 |
| 5,547,774 | A | 8/1996 | Gimzewski et al. | 428/694 |
| 5,557,596 | A | 9/1996 | Gibson et al. | 369/101 |
| 5,561,300 | A | 10/1996 | Wada et al. | 250/492.2 |
| 5,562,776 | A | 10/1996 | Sapru et al. | 118/723 |
| 5,567,241 | A | 10/1996 | Tsu et al. | 118/723 |
| 5,591,501 | A | 1/1997 | Ovshinsky et al. | 428/64.1 |
| 5,596,522 | A | 1/1997 | Ovshinsky et al. | 365/113 |
| 5,597,411 | A | 1/1997 | Fritzsche et al. | 117/104 |
| 5,606,162 | A | 2/1997 | Buser et al. | 250/306 |
| 5,615,143 | A | 3/1997 | MacDonald et al. | 365/112 |
| 5,623,476 | A | 4/1997 | Eguchi et al. | 369/126 |
| 5,670,224 | A | 9/1997 | Izu et al. | 428/35.8 |
| 5,679,952 | A | 10/1997 | Lutwyche et al. | 250/306 |
| 5,687,112 | A | 11/1997 | Ovshinsky | 365/163 |
| 5,689,494 | A | 11/1997 | Ichikawa et al. | 369/126 |
| 5,694,054 | A | 12/1997 | Ovshinsky et al. | 326/35 |
| 5,694,146 | A | 12/1997 | Ovshinsky et al. | 345/91 |
| 5,714,768 | A | 2/1998 | Ovshinsky et al. | 257/40 |
| 5,721,721 | A | 2/1998 | Yanagisawa et al. | 369/126 |
| 5,751,683 | A * | 5/1998 | Kley | 369/126 |
| 5,751,685 | A | 5/1998 | Yi | 369/126 |
| 5,757,446 | A | 5/1998 | Ovshinsky et al. | 349/49 |
| 5,777,977 | A | 7/1998 | Fujiwara et al. | 369/126 |
| 5,778,134 | A | 7/1998 | Sakai et al. | 386/46 |
| 5,793,743 | A | 8/1998 | Duerig et al. | 369/126 |
| 5,801,472 | A | 9/1998 | Wada et al. | 310/309 |
| 5,804,710 | A | 9/1998 | Mamin et al. | 73/105 |
| 5,808,973 | A | 9/1998 | Tanaka | 369/14 |
| 5,812,516 | A | 9/1998 | Nose et al. | 369/126 |
| 5,822,285 | A | 10/1998 | Rugar et al. | 369/44.26 |
| 5,825,046 | A | 10/1998 | Czubatyj | 257/2 |
| 5,835,477 | A | 11/1998 | Binnig et al. | 369/126 |
| 5,848,077 | A | 12/1998 | Kamae et al. | 371/53 |
| 5,851,902 | A | 12/1998 | Sakai et al. | 438/459 |
| 5,856,967 | A | 1/1999 | Mamin et al. | 369/126 |
| 5,861,754 | A | 1/1999 | Ueno et al. | 324/660 |
| 5,877,497 | A | 3/1999 | Binnig et al. | 250/306 |
| 5,886,922 | A * | 3/1999 | Saito et al. | 365/164 |
| 5,912,839 | A | 6/1999 | Ovshinsky et al. | 365/185.03 |
| 5,929,438 | A | 7/1999 | Suzuki et al. | 250/306 |
| 5,933,365 | A | 8/1999 | Klersky et al. | 365/148 |
| 5,935,339 | A | 8/1999 | Henderson et al. | 134/1 |
| 5,953,306 | A | 9/1999 | Yi | 369/126 |
| 5,962,949 | A | 10/1999 | Dhuler et al. | 310/307 |
| 6,000,021 | A | 12/1999 | Saito et al. | 711/163 |
| 6,000,047 | A | 12/1999 | Kamae et al. | 714/710 |
| 6,001,519 | A | 12/1999 | Yang et al. | 430/20 |
| 6,017,618 | A | 1/2000 | Gupta et al. | 428/321.1 |
| 6,027,951 | A | 2/2000 | MacDonald et al. | 438/20 |
| 6,028,393 | A | 2/2000 | Izu | 315/111.01 |
| RE36,603 | E | 3/2000 | Pohl et al. | 365/151 |
| 6,038,916 | A | 3/2000 | Cleveland et al. | 73/105 |
| 6,054,745 | A | 4/2000 | Nakos et al. | 257/415 |
| 6,075,719 | A | 6/2000 | Lowrey | 365/148 |

| | | | | | | | |
|---|---|---|---|---|---|---|---|
| 6,084,849 | A | 7/2000 | Durig et al. ............... 369/126 | 6,894,272 | B2 * | 5/2005 | Kranz et al. ............... 250/234 |
| 6,087,580 | A | 7/2000 | Ovshinsky ............... 136/261 | 6,930,368 | B2 | 8/2005 | Hartwell et al. ............ 257/418 |
| 6,087,674 | A | 7/2000 | Ovshinsky ............... 257/2 | 6,982,898 | B2 | 1/2006 | Rust |
| 6,088,320 | A | 7/2000 | Bayer et al. ............... 369/101 | 6,985,377 | B2 * | 1/2006 | Rust ............... 365/151 |
| 6,124,663 | A | 9/2000 | Haake et al. ............... 310/307 | 7,020,064 | B2 | 3/2006 | Kim et al. ............... 369/126 |
| 6,141,241 | A | 10/2000 | Ovshinsky | 7,026,676 | B2 | 4/2006 | Ahner et al. ............... 257/295 |
| 6,186,090 | B1 | 2/2001 | Dotter, II ............... 118/718 | 7,027,364 | B2 | 4/2006 | Hong et al. ............... 369/13.01 |
| 6,196,061 | B1 | 3/2001 | Adderton et al. ............... 73/105 | 7,041,394 | B2 | 5/2006 | Weller et al. ............... 428/836 |
| 6,236,589 | B1 | 5/2001 | Gupta et al. ............... 365/151 | 7,042,828 | B2 * | 5/2006 | Kley ............... 369/126 |
| 6,245,280 | B1 | 6/2001 | Tan et al. ............... 264/430 | 7,068,911 | B2 * | 6/2006 | Hatakoshi ............... 385/146 |
| 6,249,747 | B1 | 6/2001 | Binnig et al. ............... 369/126 | 7,233,517 | B2 * | 6/2007 | Rust ............... 365/151 |
| 6,252,226 | B1 * | 6/2001 | Kley ............... 250/306 | 2002/0021139 | A1 | 2/2002 | Jackson |
| RE37,259 | E | 7/2001 | Ovshinsky | 2002/0101573 | A1 | 8/2002 | Ishibashi et al. |
| 6,275,410 | B1 | 8/2001 | Morford ............... 365/151 | 2002/0110074 | A1 | 8/2002 | Gibson |
| 6,305,788 | B1 | 10/2001 | Silverbrook ............... 347/54 | 2002/0135917 | A1 | 9/2002 | Davidson |
| 6,314,014 | B1 | 11/2001 | Lowrey ............... 365/100 | 2002/0173153 | A1 | 11/2002 | Lee et al. |
| 6,337,479 | B1 * | 1/2002 | Kley ............... 250/234 | 2003/0007443 | A1 | 1/2003 | Nickel |
| 6,339,217 | B1 | 1/2002 | Kley ............... 250/216 | 2003/0032290 | A1 | 2/2003 | Lee et al. |
| 6,359,755 | B1 | 3/2002 | Dietzel et al. ............... 360/244.3 | 2003/0081527 | A1 | 5/2003 | Gibson et al. |
| 6,366,340 | B1 | 4/2002 | Ishibashi et al. ............... 355/69 | 2003/0081532 | A1 | 5/2003 | Gibson |
| 6,369,400 | B1 | 4/2002 | Haeberle et al. ............... 250/548 | 2003/0128494 | A1 | 7/2003 | Birecki et al. |
| 6,370,306 | B1 * | 4/2002 | Sato et al. ............... 385/129 | 2003/0133324 | A1 | 7/2003 | Baumeister et al. |
| 6,411,589 | B1 | 6/2002 | Hoen et al. ............... 369/126 | 2003/0185139 | A1 | 10/2003 | Ives |
| 6,452,891 | B1 | 9/2002 | Hennessey ............... 369/116 | 2003/0189200 | A1 | 10/2003 | Lee et al. |
| 6,463,874 | B1 | 10/2002 | Dotter, II et al. ............... 118/723 | 2003/0207525 | A1 | 11/2003 | Trivedi |
| 6,480,438 | B1 | 11/2002 | Park ............... 365/260.06 | 2003/0218960 | A1 | 11/2003 | Albrecht et al. |
| 6,487,113 | B1 | 11/2002 | Park ............... 365/163 | 2004/0047275 | A1 | 3/2004 | Cherubini et al. |
| 6,501,210 | B1 | 12/2002 | Ueno et al. ............... 310/331 | 2004/0071021 | A1 | 4/2004 | Binnig et al. |
| 6,507,552 | B2 | 1/2003 | Gibson ............... 369/126 | 2004/0077123 | A1 | 4/2004 | Lee et al. |
| 6,507,553 | B2 * | 1/2003 | Kley ............... 369/126 | 2004/0090823 | A1 | 5/2004 | Brocklin et al. |
| 6,511,862 | B2 | 1/2003 | Hudgens ............... 438/95 | 2004/0095868 | A1 | 5/2004 | Birecki et al. |
| 6,511,867 | B2 | 1/2003 | Lowrey ............... 438/128 | 2004/0097002 | A1 | 5/2004 | Pogge et al. |
| 6,515,898 | B2 | 2/2003 | Baumeister et al. ............... 365/174 | 2004/0105323 | A1 | 6/2004 | Giovanni et al. |
| 6,521,921 | B2 | 2/2003 | Lim et al. ............... 257/255 | 2004/0107770 | A1 | 6/2004 | Despont et al. |
| 6,522,566 | B2 | 2/2003 | Carter ............... 365/118 | 2004/0113641 | A1 | 6/2004 | Birecki et al. |
| 6,531,373 | B2 | 3/2003 | Gill ............... 438/400 | 2004/0114490 | A1 | 6/2004 | Antonakopoulos et al. |
| 6,534,781 | B2 | 3/2003 | Dennison ............... 257/5 | 2004/0136277 | A1 | 7/2004 | Binnig et al. |
| 6,542,400 | B2 | 4/2003 | Chen et al. ............... 365/151 | 2004/0145941 | A1 | 7/2004 | Rust |
| 6,545,907 | B1 | 4/2003 | Lowrey et al. ............... 365/163 | 2004/0150472 | A1 | 8/2004 | Rust et al. |
| 6,563,164 | B2 | 5/2003 | Lowrey et al. ............... 257/314 | 2004/0168527 | A1 | 9/2004 | Nakayama et al. |
| 6,566,700 | B2 | 5/2003 | Xu ............... 257/296 | 2004/0218507 | A1 | 11/2004 | Binnig et al. |
| 6,567,293 | B1 | 5/2003 | Lowrey et al. ............... 365/100 | 2004/0233817 | A1 | 11/2004 | Antonakopoulos et al. |
| 6,567,296 | B1 | 5/2003 | Casagrande et al. ............... 165/105 | 2004/0252553 | A1 | 12/2004 | Sharma |
| 6,570,784 | B2 | 5/2003 | Lowrey ............... 365/163 | 2004/0252590 | A1 | 12/2004 | Sharma |
| 6,589,714 | B2 | 7/2003 | Maimon ............... 430/313 | 2004/0257887 | A1 | 12/2004 | Binnig et al. |
| 6,593,176 | B2 | 7/2003 | Dennison ............... 438/200 | 2005/0013230 | A1 | 1/2005 | Adelmann |
| 6,608,773 | B2 | 8/2003 | Lowrey ............... 365/100 | 2005/0018588 | A1 | 1/2005 | Duerig et al. |
| 6,611,033 | B2 | 8/2003 | Hsu et al. ............... 257/414 | 2005/0025034 | A1 | 2/2005 | Gibson |
| 6,611,140 | B1 | 8/2003 | Bloechl et al. ............... 324/207 | 2005/0029920 | A1 | 2/2005 | Birecki et al. |
| 6,613,604 | B2 | 9/2003 | Maimon ............... 438/95 | 2005/0036428 | A1 | 2/2005 | Adelmann |
| 6,617,192 | B1 | 9/2003 | Lowrey ............... 438/95 | 2005/0037560 | A1 | 2/2005 | Duerig et al. |
| 6,617,569 | B2 * | 9/2003 | Narita et al. ............... 250/216 | 2005/0038950 | A1 | 2/2005 | Adelmann |
| 6,621,095 | B2 | 9/2003 | Chiang ............... 257/5 | 2005/0047307 | A1 | 3/2005 | Frommer et al. |
| 6,624,648 | B2 * | 9/2003 | Eldridge et al. ............... 324/761 | 2005/0050258 | A1 | 3/2005 | Frommer et al. |
| 6,628,452 | B2 | 9/2003 | Haeberle ............... 359/298 | 2005/0055170 | A1 | 3/2005 | Gibson et al. |
| 6,646,297 | B2 | 11/2003 | Dennison ............... 257/296 | 2005/0066107 | A1 | 3/2005 | Bachtold et al. |
| 6,647,766 | B2 | 11/2003 | Despont et al. ............... 73/105 | 2005/0082598 | A1 | 4/2005 | Liao et al. |
| 6,665,258 | B1 | 12/2003 | Dietzel et al. ............... 369/126 | 2005/0088873 | A1 | 4/2005 | Tran et al. |
| 6,667,900 | B2 | 12/2003 | Lowrey ............... 365/171 | 2005/0122786 | A1 | 6/2005 | Antonakopoulos et al. |
| 6,671,710 | B2 | 12/2003 | Ovshinsky ............... 708/493 | 2005/0128927 | A1 | 6/2005 | Milligan et al. |
| 6,673,700 | B2 | 1/2004 | Dennison ............... 438/466 | 2005/0135199 | A1 | 6/2005 | Mejia et al. |
| 6,680,808 | B2 | 1/2004 | Allenspach et al. ............... 360/59 | 2005/0135200 | A1 | 6/2005 | Mejia et al. |
| 6,696,355 | B2 | 2/2004 | Dennison ............... 438/597 | 2005/0135203 | A1 | 6/2005 | Mejia et al. |
| 6,723,421 | B2 | 4/2004 | Ovshinsky ............... 428/315.7 | 2005/0135224 | A1 | 6/2005 | Mejia et al. |
| 6,724,712 | B2 * | 4/2004 | Kley ............... 369/126 | 2005/0139883 | A1 | 6/2005 | Sharma |
| 6,733,956 | B2 | 5/2004 | Maimon ............... 430/314 | 2005/0147017 | A1 | 7/2005 | Gibson |
| 6,784,475 | B2 | 8/2004 | Hong et al. ............... 257/295 | 2005/0156271 | A1 | 7/2005 | Lam et al. |
| 6,800,865 | B2 | 10/2004 | Nakayama et al. ............... 250/492.3 | 2005/0157562 | A1 | 7/2005 | Smith et al. |
| 6,819,587 | B1 | 11/2004 | Sharma et al. ............... 365/173 | 2005/0157575 | A1 | 7/2005 | Binnig et al. |
| 6,819,588 | B2 | 11/2004 | Baumeister et al. ............... 365/174 | 2005/0169063 | A1 | 8/2005 | Cherubini et al. |
| 6,854,648 | B2 | 2/2005 | Hong et al. ............... 235/451 | 2005/0185567 | A1 | 8/2005 | Adelmann |
| 6,862,206 | B1 | 3/2005 | Carter et al. ............... 365/151 | 2005/0201255 | A1 | 9/2005 | Champion et al. |
| 6,885,808 | B2 * | 4/2005 | Hatakoshi ............... 385/146 | 2005/0201256 | A1 | 9/2005 | Champion et al. |

| | | |
|---|---|---|
| 2005/0201257 A1 | 9/2005 | Champion et al. |
| 2005/0201258 A1 | 9/2005 | Champion et al. |
| 2005/0207234 A1 | 9/2005 | Baechtold et al. |
| 2005/0226117 A1 | 10/2005 | Champion et al. |
| 2005/0232004 A1 | 10/2005 | Rust et al. |
| 2005/0232061 A1 | 10/2005 | Rust et al. |
| 2005/0233596 A1 | 10/2005 | Chen et al. |
| 2005/0237906 A1 | 10/2005 | Gibson |
| 2005/0243592 A1 | 11/2005 | Rust et al. |
| 2005/0243659 A1 | 11/2005 | Rust et al. |
| 2005/0243660 A1 | 11/2005 | Rust et al. |
| 2005/0247873 A1 | 11/2005 | Hilton |
| 2005/0259366 A1 | 11/2005 | Champion et al. |
| 2005/0259503 A1 | 11/2005 | Hilton |
| 2005/0281075 A1 | 12/2005 | Chen et al. |
| 2005/0281174 A1 | 12/2005 | Gotsmann et al. |
| 2005/0286321 A1 | 12/2005 | Adelmann |
| 2006/0003493 A1 | 1/2006 | Milligan et al. |
| 2006/0006471 A1 | 1/2006 | Rossel et al. |
| 2006/0023612 A1 | 2/2006 | Hilton et al. |
| 2006/0023613 A1 | 2/2006 | Mejia et al. |
| 2006/0028964 A1 | 2/2006 | Mejia et al. |
| 2006/0028965 A1 | 2/2006 | Fasen et al. |
| 2006/0039250 A1 | 2/2006 | Cherubini et al. |

FOREIGN PATENT DOCUMENTS

| | | |
|---|---|---|
| EP | 0 734 017 B1 | 9/1996 |
| EP | 0 788 149 A1 | 6/1997 |
| JP | 3295043 | 12/1991 |
| JP | 3295044 | 12/1991 |
| JP | 4159636 | 6/1992 |
| JP | 9198726 | 7/1997 |
| WO | WO 96/11472 | 4/1996 |
| WO | WO 97/05610 | 2/1997 |
| WO | WO 02/37488 A1 | 5/2002 |

OTHER PUBLICATIONS

Sumio Hosaka, Hajime Koyanagi and Atsushi Kukukawa, Nanometer Recording on Graphite and Si Substrate Using an Automic Force Microscope in Air, Japan Journal of Applied Physics, vol. 32 (1993) pp. L464-467, Part 2, No. 3B, Mar. 15, 1993, Central Research Laboratory, Hitachi Limited, Kokubunji, Tokyo 185.

Atsushi Kikukawa, Sumio Hosaka, Yukio Honda[1] and Ryo Imura, Phase-Controlled Scanning Force Microscope, Japanese Journal of Applied Physics, vol. 33 (1994) pp. L1286-L1288, Part 2, No. 9A, Sep. 1, 1994, Advanced Research Laboratory, Hitachi Limited, 1-280 Higashi-koigakubo, Kokubunji-shi, Tokyo 185, 'Central Research Laboratory, Hitachi Limited, 1-280 Higashi-koigakubo, kokubunji-shi, Tokyo.

William P. King, Daniel A. Fletcher and Y. Sungtaek Ju, Nanometer-Scale Thermal Processing for Advanced Manufacturing (YIP '96), Office of Naval Research Annual Grant Report, First Annual Report: May 1, 1996-Apr. 30, 1997, pp. 1-8.

T. C. Reiley, T.R. Albrecht, D.W. Albrecht, K. Kuroki and M. Aoyagi, A Micro Hard Disk Drive, I.B.M.—Almaden Research Center, I.B.M. Storage System Division, Electrochemical Society Processing, vol. 98-20, pp. 10-18.

Seiji Heike, Yasuo Wada and Tomihiro Hashizume, Correlation Between Tip-Apex Shape and Surface Modification by Scanning Tunneling Microscopy, Journal of Applied Physics, vol. 86, No. 8, pp. 4220-4224.

Michael Brooks, Hole in One, New Scientist, Mar. 27, 1999, pp. 46-48.

H. Jonathan Mamin, Robert P. Ried, Bruce D. Terris and Daniel Rugar, High-Density Data Storage Based on the Atomic Force Microscope, Proceedings of the IEEE, vol 87, No. 6, Jun. 1999, pp. 1014-1027.

Steven W. Schlosser, John Linwood Griffin, David F. Nagle and Gregory R. Ganger, Filling the Memory Access Gap: A Case for On-Chip Magnetic Storage, School of Computer Science, Carnegie Mellon University, Nov. 1999.

Steven W. Schlosser, John Lindwood Griffin, David F. Nagle and Gregory R. Ganger, Carnegie Mellon University, Designing Computer Systems with MEMS-Based Storage, 9th International Conference on Architectural Support for Programming Languages and Operating Systems, 2000.

S. Hosaka, K. Etoh, A. Kikukawa and H. Koyanagi, Megahertz Silicon Atomic Force Microscopy (AFM) Catilever and High-Speed Readout in AFM-Based Recording, Journal of Vacuum Science Technology, vol. 18, No. 1, Jan./Feb. 2000, pp. 94-99.

Robert P. Ried, Air-Bearing Sliders and Plane-Plane-Concave Tips for Atomic Force Microscope Cantilevers Journal of Microelectromechanical Systems, vol. 9, No. 1, Mar. 2000, pp. 52-57.

L. Richard Carley, Gregory R. Ganger and David F. Nagle, Mems-Based Integrated-Circuit Mass-Storage Systems, Communications of ACM, vol. 43, No. 11, Nov. 2000, pp. 73-80.

P. Vettiger, M. Despont, U. Dreschler, U. Durig, W. Haberle, M.I. Lutwyche, H.E. Rothuizen, R. Stutz, R. Widmer and G.K. Binnig, The "Multipede"—More than one thousand tips for future AFM data storage, I.B.M. J. Res. Develop., vol. 44, No. 3, May 2000, pp. 323-340.

R.B. Zmood, L. Qin, D.K. Sood, T. Vinay and D. Meyrick, School of Electrical and Computer System Engineering, Royal Melborne Institute of Technology, Melbourne, Victoria 3000, Australia, Magnetic MEMS Used in Smart Structures Which Exploit Magnetic Materials Properties, Smart Structures and Devices, Proceeding of the SPIE, vol. 4235, 2001, pp. 173-187.

Michael Gross, Small is Great!, New Scientist, Jul. 14, 2001, pp. 1-4.

G. Cherubini, T. Antonakopoulos, P. Bachtold, G.K. Binnig, M. Despont, U. Dreschler, A. Dholakia, U. Durig, E. Eleftheriou, B. Gotsmann, W. Haberle, M.A. Lantz, T. Loeliger, H. Pozidis, H.E. Rothuizen, R. Stutz and P. Vettiger, I.B.M. Research, Zurich Research Laboratory, The Millepide, a Very Dense, Highly Parallel Scanning-Probe Data-Storage System, ESSCIRC 2002, pp. 121-125.

E. Eleftheriou, G. Cherubini, H. Pozidis, H.E. Rothuizen and P. Vettiger, Millipede—a MEMS-Based Scanning-Probe Data-Storage Systems, APMRC 2002, pp. 1-8.

Satoshi Kawamura, Electronics Device Division, Hitachi Maxwell, Limited, Coil on Chip RFID System by Super EF2 Technology, Nippon Oyo Jiki Gakkai Kenkyukai Shiryo, vol. 123, pp. 21-25.

Molecular Chip Patent, Poptronics, vol. 3, No. 5, May 2002, pp. 11-12.

Kenneth J. Korane, A King-Size Future for Nanosize Machines, Machine Design, vol. 74, No. 18, Sep. 19, 2002, pp. 88-94.

Peter Vettiger and Gerd Binnig, The Nanodrive Project: Inverting a Nanotechnology Device for Mass Production and Consumer Use is Trickier than it Sounds, Scientific American, vol. 288, No. 1, 2002, pp. 47-53.

Mustafa Uysal, Arif Merchant, Guillermo A. Alvarez, Hewlett Packard Laboratories, Using MEMS-Based Storage in Disk Arrays, Proceedings of FAST '03: 2nd USENIX Conference on File and Storage Technologies, USENIX Association, pp. 89-101.

Kiyoshi, T. et al., "Switching and memory phenomenon in Langmuir-Blodgett film using a scanning tunneling microscope," Canon, Inc., IEIC Technical Report (1994), vol. 93, No. 524 (OME93 54-59), pp. 7012, Fig. 6, Ref. 15.

Kiyoshi, T. et al., Application and Progess in the Scanning Probe Microscopy, High Density Information Storage Using Langmuir-Blodgett Film and Atomic Force Microscopy, Canon, Inc., Journal of the Surface Science Society of Japan (1997), vol. 18, No. 4, pp. 213-218, Fig. 7, Reg. 14.

Kado, H. and Tohda, T., "Nanometer-scale recording on chalcogenic films with an atomic force microscope," Appl. Phys. Lett., vol. 66, No. 22, May 29, 1995, pp. 2961-2962.

Yano, K. et al., "Nanometer scale conductance change in a Langmuir-Blodgett film with the atomic force microscope," Appl. Phys. Lett., vol. 2, Jan. 8, 1996, pp. 188-190.

Yano, L. and Ikeda, T., "Stable bit formulation in polyimide Langmui-Blodgett film using an atomic force microscope," Appl. Phys. Lett., vol. 80, vol. 6, Feb. 11, 2002, pp. 1067-1069.

Barrett, R.C. and Quate, C.F.., "Large-scale charge storage by scanning capacitance microscopy," Ultramicroscopy 42-44 (1992) pp. 262-267.

Gardner, E., "AFM Fabricates a Tiny Transistor," Science, vol. 266, Oct. 28, 1994, p. 543.

Hagan, H.P., et al., "Temporal behaviour of nanofeatures on Au," Ultramicroscopy, 42-44 (1992), pp. 587-593.

Majumdar, A., et al., "Nanometer-scale lithography using the atomic force microscope," Appl. Phys. Lett., vol. 61, No. 19, Nov. 9, 1992, pp. 2293-2295.

Mamin, H.J. and Ruger, D., "Thermomechanical writing with an atomic force microscope tip," App. Phys. Lett., vol. 61, No. 8, Aug. 24, 1992, pp. 1003-1005.

Mamin, H.J. et al., "High Density data storage using proximal probe techniques," The IBM Journal of Research and Development, vol. 39, No. 6, Nov. 1995, pp. 681-699.

Manalis, S. et al., "Submicron studies of recording media using thin-film magnetic scanning probes," Applied Physics Letters, vol. 66, No. 19, May 8, 1995, pp. 2585-2587.

Terris, B.D. et al., "Atomic force microscope-base data storage: track servo and wear study," Applied Physics A vol. 66, pp. S809-S813 (1998), (IBM Almaden Research Center, presented STM 97).

Uesugi, K. and Yao, T., "Nanometer-scale fabrication on graphite surfaces by scanning tunneling microscopy," Ultramicroscopy, 42-44 (1992), pp. 1443-1445.

PCT Written Opinion mailed Dec. 18, 2000, International Application No. PCT/US99/30326, filed Dec. 20, 1999.

T.C. Shen et al., Ion irradiation effects on graphite with the scanning tunneling microscope; J.Vac.Sci. Technol. B9(2), Mar./Apr. 1991; pp. 1376-1379.

U. Staufer et al., Tailoring nanostructures with a scanning tunneling microscope; J. Vac.Sci. Technol. B9(2), Mar./Apr. 1991; pp. 1389-1393.

H.J. Mamin, Gold deposition from a scanning tunneling microscope tip; et al., J.Vac.Sci. Technol. B9(2), Mar./Apr. 1991, pp. 1398-1402.

J.A. Dagata, et al., Pattern generation on semiconductor surfaces by a scanning tunneling microscope operating in air, J. Vac. Sci. Technol. B9(2), Mar./Apr. 1991, pp. 1384-1388.

T.R. Albrecht, et al., Nanometer-scale hole formation on graphite using a scanning tunneling microscope, Appl. Phys. Lett., vol. 55, No. 17, Oct. 23, 1989, pp. 1727-1729.

M. Aono, Has Japan Begun to Move Toward Atomic Level Material Processing?, Science, vol. 258, Oct. 23, 1992.

T. C. Reiley, T.R. Albrecht, D.W. Albrecht, K. Kuroki and M. Aoyagi, A Micro Hard Disk Drive, I.B.M.—Almaden Research Center, I.B.M. Storage System Division, Electrochemical Society Processing, vol. 98-20, pp. 10-18, 1998.

Seiji Heike, Yasuo Wada and Tomihiro Hashizume, Correlation Between Tip-Apex Shape and Surface Modification by Scanning Tunneling Microscopy, Journal of Applied Physics, vol. 86, No. 8, pp. 4220-4224, Oct. 1999.

Bo Hong, Exploring the Usage of MEMS-based Storage as Metadata Storage and Disk Cache in Storage Hierarchy, Storage Systems Research Center, Jack Baskin School of Engineering, University of California at Santa Cruz, http://www.cse.ucsc.edu/~hongbo/publications/mems-metadata.pdf, 2004.

P. Vettiger, M. Despont, U. Dreschler, U. Durig, W. Haberle, M.I. Lutwyche, H.E. Rothuizen, R. Stutz, R. Widmer and G.K. Binnig, The "Multipede"—More than one thousand tips for future AFM data storage, I.B.M. J. Res. Develop., vol. 44, No. 3, May 2000, pp. 323-340.

Satoshi Kawamura, Electronics Device Division, Hitachi Maxwell, Limited, Coil on Chip RFID System by Super EF2 Technology, Nippon Oyo Jiki Gakkai Kenkyukai Shiryo, vol. 123, pp. 21-25, 2002.

Mustafa Uysal, Arif Merchant, Guillermo A. Alvarez, Hewlett Packard Laboratories, Using MEMS-Based Storage in Disk Arrays, Proceedings of FAST '03: 2nd USENIX Conference on File and Storage Technologies, USENIX Association, pp. 89-101, Mar. 2003.

\* cited by examiner

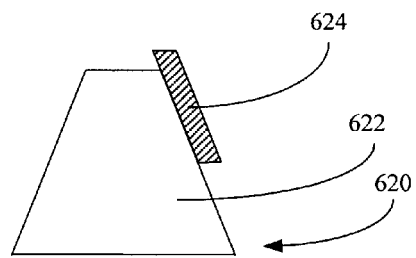
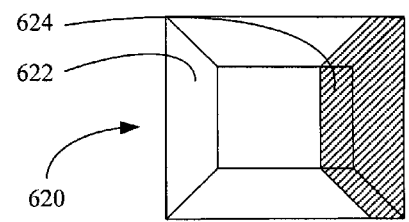
FIG. 6A  FIG. 6B
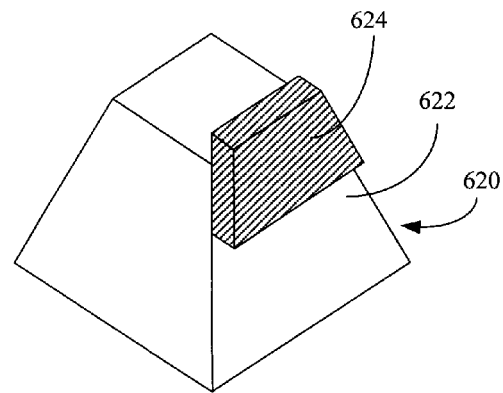
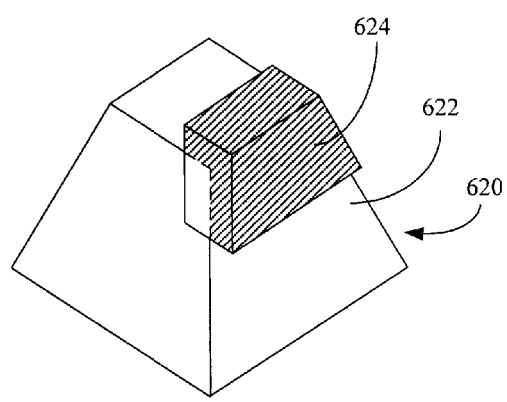
FIG. 6C  FIG. 6D

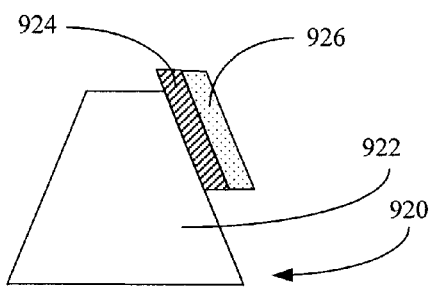
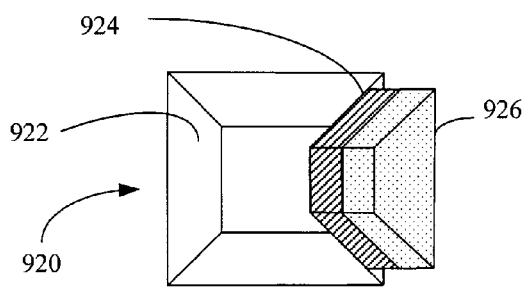
FIG. 9A    FIG. 9B
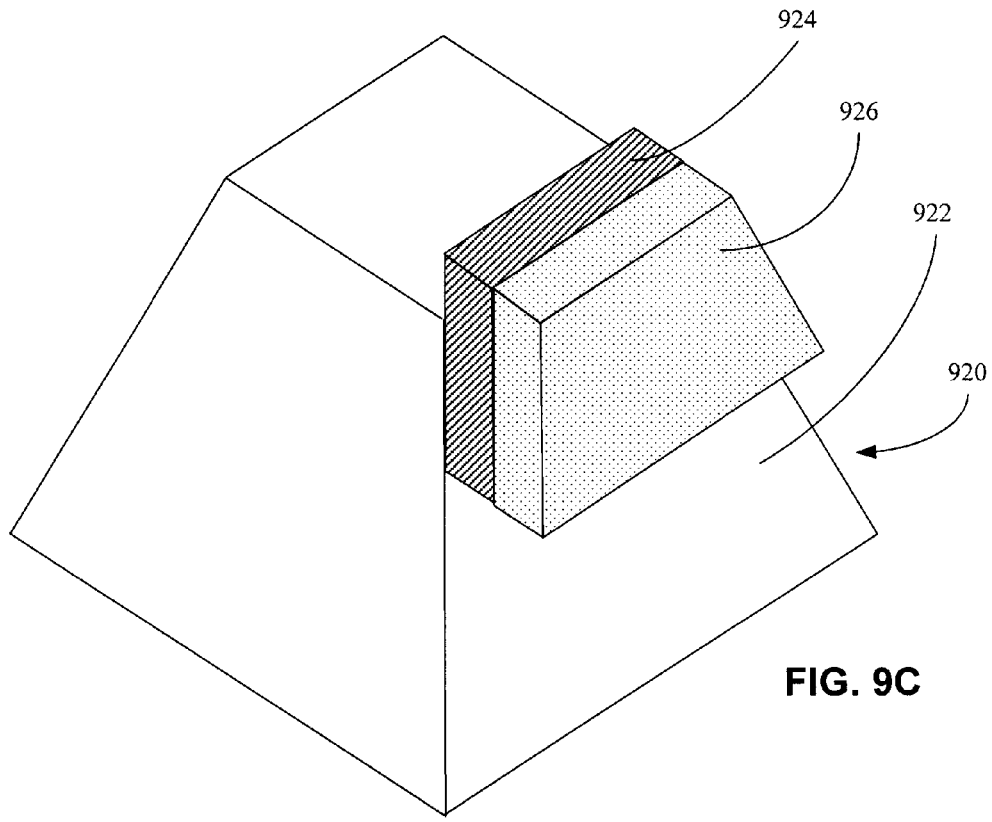
FIG. 9C

ATOMIC PROBES AND MEDIA FOR HIGH DENSITY DATA STORAGE

This application is a Continuation of application Ser. No. 10/684,661 filed on Oct. 14, 2003, now U.S. Pat. No. 7,233,517 entitled ATOMIC PROBES AND MEDIA FOR HIGH DENSITY DATA STORAGE and claims priority to the following U.S. Provisional Patent Application:

U.S. Provisional Patent Application No. 60/418,923 entitled "Atomic Probes and Media for High Density Data Storage," filed Oct. 15, 2002.

CROSS-REFERENCE TO RELATED PATENT APPLICATIONS

This application incorporates by reference all of the following co-pending applications:

U.S. patent application Ser. No. 10/684,883, entitled "Molecular Memory Integrated Circuit Utilizing Non-Vibrating Cantilevers," filed Oct. 14, 2003;

U.S. patent application Ser. No. 10/684,760, entitled "Fault Tolerant Micro-Electro Mechanical Actuators," Oct. 14, 2003;

U.S. patent application Ser. No. 10/685,045, entitled "Phase Change Media for High Density Data Storage," filed Oct. 14, 2003;

U.S. Provisional Patent Application No. 60/418,616 entitled "Molecular Memory Integrated Circuit Utilizing Non-Vibrating Cantilevers," filed Oct. 15, 2002;

U.S. Provisional Patent Application No. 60/418,612 entitled "Fault Tolerant Micro-Electro Mechanical Actuators," filed Oct. 15, 2002; and U.S. Provisional Patent Application No. 60/418,618 entitled "Molecular Memory Integrated Circuit," filed Oct. 15, 2002.

U.S. Provisional Patent Application No. 60/418,619 entitled "Phase Change Media for High Density Data Storage," filed Oct. 15, 2002.

BACKGROUND OF THE INVENTION

1. Field of the Invention

This invention relates to media for high density data storage in molecular memory integrated circuits for use in micro-electric mechanical systems (MEMS).

2. Description of the Related Art

Phase change media are used in the data storage industry as an alternative to traditional recording devices such as magnetic recorders (tape recorders and hard disk drives) and solid state transistors (EEPROM and FLASH). CD-RW data storage discs and recording drives utilize phase change technology to enable write-erase capability on a compact disc-style media format. Like other phase change media technology, CD-RWs take advantage of changes in optical properties when media material is heated above ambient temperature to induce a phase change from a crystalline state to an amorphous state.

Data storage devices using optical phase change media have enabled inexpensive, medium density storage with the flexibility of erase and rewrite capability. Unfortunately, current technology does not enable the very high densities required for use in today's high capacity portable electronics and tomorrow's next generation technology such as systems-on-a-chip and MEMs. Consequently, there is a need for solutions which permit higher density data storage, while still providing the flexibility of current phase change media solutions.

SUMMARY OF THE INVENTION

High density data storage requires a media in which to store data. One such media is a phase change media that alters its resistivity when data is written to the media. The media can include an overcoat. The overcoat can help reduce physical damage inflicted on the media from a device such as a cantilever tip in a molecular memory integrated circuit used to write to or read from the media. Additionally, data written to the media can be in many states. Hence, the media can store digital data and/or analog data.

Other objects, aspects and advantages of the invention can be obtained from reviewing the figures, specification and claims.

BRIEF DESCRIPTION OF THE DRAWINGS

Further details of the present invention are explained with the help of the attached drawings in which:

FIGS. 6A, 6B, and 6C depict another embodiment of the invention showing another atomic probe with a coating on one side of a core. FIG. 6D depict yet another embodiment of the invention.

FIGS. 9A, 9B, and 9C depict another embodiment of the invention showing another atomic probe with a coating on one side of a core, where coating has a protective material connected with it.

DETAILED DESCRIPTION OF THE DRAWINGS

Figure 1:
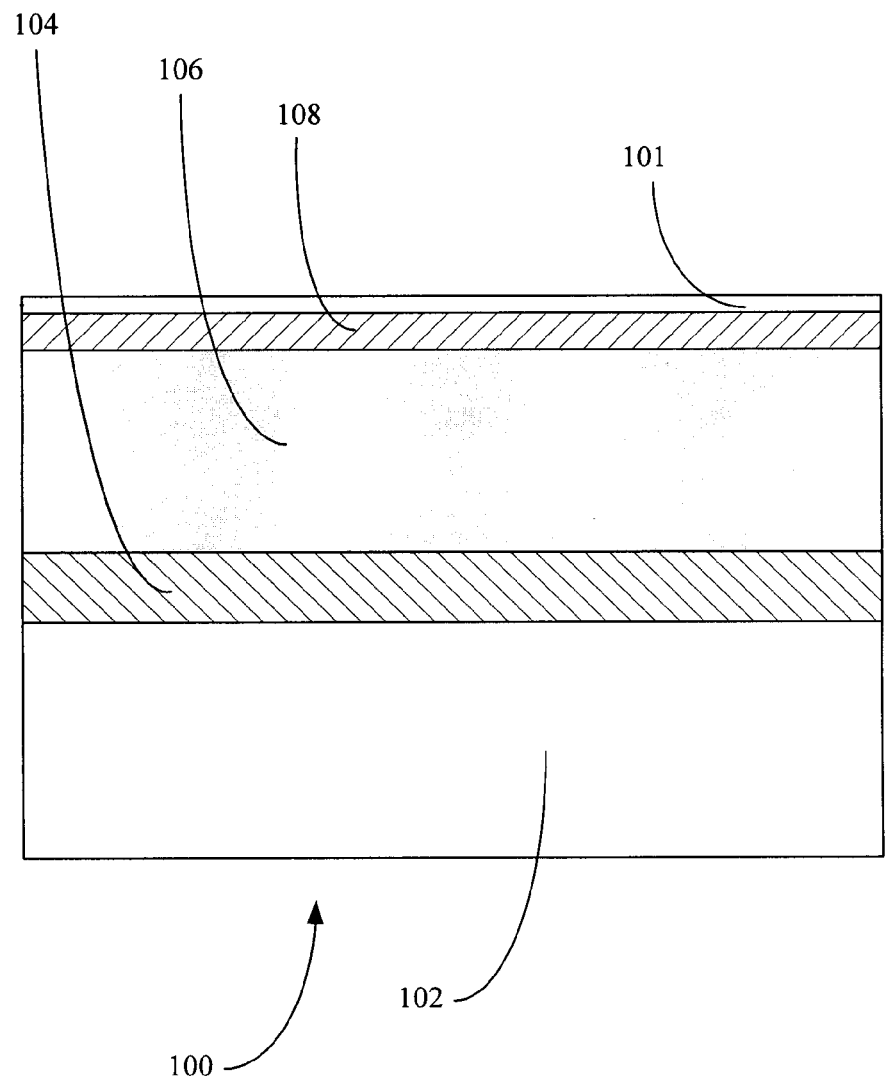
FIG. 1 is an embodiment of the invention that shows a cross-section of a media device in an unwritten state.

FIG. 1 is an embodiment of the invention that shows a cross-section of the media device 100 in an unwritten state. The media device 100 includes a substrate 102, an undercoat 104, a media 106 and an overcoat 108. Substrate 102 supports the media device. Undercoat 104 can be formed on top of substrate 102, however, undercoat 104 is not required. Next, media 106 is formed and then an overcoat 108 is placed after the media 106.

Media device 100 can be made from a variety of materials. For instance, in one embodiment, media device 100 can include an undercoat 104. Undercoat 104 can be placed over the substrate. The substrate is typically a material with a low conductivity. In one embodiment, undercoat 104 is a highly conductive material. For instance, one embodiment uses a material for undercoat 104 that includes tungsten. Yet another embodiment of undercoat 104 includes platinum. Other embodiments of undercoat 104 can include gold, aluminum, or copper.

While undercoat 104 has been described as being a highly conductive material, undercoat 104 can also be an insulator. For instance, undercoat 104 can be made from an oxide or nitride material, thereby insulating the media 106 from the substrate 102.

In another embodiment, media device 100 includes an overcoat 108. Overcoat 108 is made from a material that is different from media 106. The overcoat 108 is selected to prevent physical damage to the media or to the probe tip when the probe tip comes into contact with overcoat 108. The overcoat is selected to reduce wear of the overcoat and probe tip over an extended time period. Overcoat 108 typically has a low conductance characteristic, but a high hardness characteristic. For instance, in one embodiment overcoat 108 is made from titanium nitride, which is a poor conductor, but is hard. In another embodiment, overcoat 108 can be made of a diamond-like carbon. The conductivity of diamond-like carbon can be adjusted in the manufacturing process through a variety of techniques. One such technique includes using a dopant such as nitrogen in the formation of the diamond-like carbon.

In yet another embodiment of media device 100, overcoat 108 can be an insulator. For instance, overcoat 108 can be an insulator such as nitride, for example silicon nitride. If an insulator is used for overcoat 108, then any current applied to memory device 100 will have to tunnel through the insulator before reaching the media 106. Thus, in one embodiment, the insulator used for overcoat 108 is kept relatively thin, thereby reducing the amount of tunneling required before a current can interact with media 106. In another embodiment, the insulator for overcoat 108 is an oxide. A number of different insulators are useful for overcoat 108, and these insulators have an advantage of being very hard.

In other embodiments of media device 100, media 106 is a phase change material. In still other embodiments of media device 100, media 106 is a phase change material such as germanium, tellurium and/or antimony and is commonly known as a chalcogenide. As a phase change material is subjected to different temperatures, the phase of the material changes between crystalline and amorphous states. As a result of this phase change, the resistivity of the material changes. This resistivity change is quite large in phase change materials and can be easily detected by a probe tip that has a conductive coating on it by passing current through the tip and the media.

In yet another embodiment of media device 100, media 106 can be a magneto optic material.

In addition to overcoat 108, media device 100 can include a lubricant 101 that is placed on top of overcoat 108. For instance, in one embodiment, lubricant 101 can be molybdenum disulfide. Lubricant 101 can be a liquid. Lubricant 101 can also be any number of thin liquids. Lubricant 101 can be applied to overcoat 108 by many different methods. In one embodiment, lubricant 101 is deposited on top of overcoat 108 using a deposition process. In another embodiment, lubricant 101 is sprayed onto overcoat 108.

One method of making the media device 100 is with a traditional semiconductor manufacturing processes. Yet another method of making media device 100 is to use a shadow mask. Thus, a mask wafer that contains at least one aperture is placed over a final wafer, which will contain a memory device 100. The mask wafer and final wafer are then subjected to a deposition process. During the deposition process, chemicals pass through the shadow mask and are deposited to form a media device 100.

Figure 2:
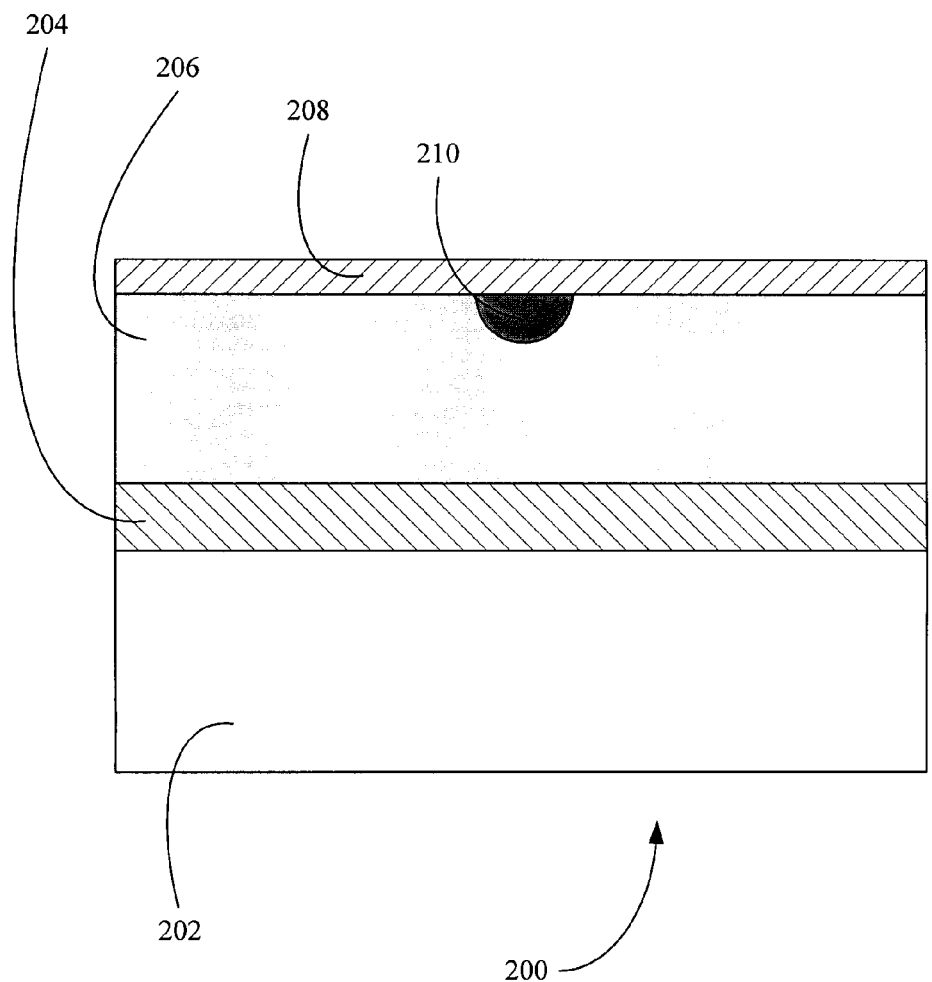
FIG. 2 is another embodiment of the invention that shows a cross-section of a media device including data bit.

FIG. 2 is another embodiment of the invention that shows a cross-section of the media device 200 including data bit. Media device 200 includes a substrate 202, an optional undercoat 204, a media 206, and an overcoat 208. The media 206 further includes a data bit 210, which represents data stored in the memory device 200.

The media can be of many different types. One embodiment is where media device 200 includes a charge storage type media 206. Charge storage media stores data as trapped charges in dielectrics. Thus, for charge storage media, media 206 would be a dielectric material that traps charges when media 206 includes a written state. Changing media 206 back to an unwritten state simply requires the removal of the trapped charges. For instance, a positive current can be used to store charges in media 206. A negative current can then be used to remove the stored charges from media 206.

Another embodiment is where media device 200 is a phase change media. Thus, media 206 can include a material that has a resistance characteristic at an ambient state, but the resistance characteristic changes in response to temperature changes. For instance, as a current is applied such that the current passes through media 206, the temperature of media 206 is increased. After media 206 is heated to a predetermined temperature, the current is removed from media 206, causing the temperature of media 206 to decrease back to the ambient state of media 206. During the cooling of media 206, the resistivity of media 206 changes from its original state, the state before the current was applied. This resistance change is caused by the thermal writing of a crystalline bit. When the resistive characteristics of media 206 change from its original state, then media 206 is said to be in a written or crystalline state. To erase the written state from memory 206, a second current is applied to media 206. The second current causes media 206 to heat to a second and higher temperature. The second current is then removed from media 206, causing media 206 to cool back to an ambient temperature. As media 206 cools, the resistivity of media 206 returns to the resistivity media 206 had at its original amorphous state, or a close approximation to the original resistivity state of media 206.

Another embodiment of a phase change material for media 206 requires media 206 to be heated to a higher temperature for a written state to exist. For instance, applying a first current to media 206 such that media 206 is heated to a temperature approximately equal to 170° C. to 200° C. As media 206 cools back to an ambient state, then the resistivity of media 206 will decrease. To reset media 206 back to an unwritten state, a second current is applied to media 206 causing media 206 to heat to a temperature somewhere in the range of 600° C. As media 206 cools back to an ambient state, any written state to the area of media 206 subjected to the second current and heated to 600° C. will revert back to the resistivity that media 206 possessed before having been changed to a written state.

Different materials can be used for media 206 to adjust the operating range for memory writing and resetting the media 206 back to an unwritten state. Altering the proportions of the elements in a chalcogenide is one way of altering the written and erased temperatures.

Yet another embodiment of the media device 200 has the resistivity of media 206 changed in a similar way, except that media 206 is also self-quenching. Thus, media 206 begins at an unwritten, ambient state. A first current is applied to media 206, thereby heating media 206 to a first predetermined temperature. For instance, a write operation can require that media 206 be heated to a temperature of at least 170° C. Then, the first current is removed from media 206 and media 206 begins to cool. As media 206 cools, the resistivity of media 206 changes such that the new resistivity characteristic can be interpreted as a written state. This state can cause the resistivity of media 206 to increase or decrease, depending on the material used for media 206. Subsequently, to erase the written memory to media 206, a second current is applied to media 206. Media 206 is heated to a second temperature (for instance, media 206 can be heated to a temperature of at least 600° C.). As media 206 cools, the resistivity of media 206 is returned back to a state approximately equal to the original state of media 206, thereby erasing the written data in media 206.

The written states within media 206, however, can be also be changed back to the ambient state of media 206, or an unwritten state, by applying heating to a large region of the memory device 200. For instance, memory device 200 can apply a current to a buried heater under the memory device 200. This heating can be applied to all of the memory locations in the memory device 200 such that the resistivity characteristics of media 206 is returned to the ambient state throughout the entire memory device 200.

As described above in some of the various embodiments of media device 200, the ambient, or unwritten, state of memory device 200 has the media 206 having a high resistivity, and the written state of media 206 having a low resistivity. In other embodiments these states can be reversed such that the ambient, or unwritten state, for memory device 200 has media 206 having a low resistivity and a written state has media 206 having a high resistivity.

Another embodiment of memory device 200 can have media 206 capable of having a plurality of resistivity states. For example, at the ambient state, the media 206 of memory device 200 can have a first resistivity. Media 206 can then be heated to different temperatures and then cooled, thereby changing the resistivity of media 206. One embodiment senses whether the resistivity for media 206 is at or near the ambient state for media 206 or at some state that is sufficiently different to be measured as a state different than ambient, or unwritten. Another embodiment is able to sense a plurality of resistivity states that media 206 can possess.

For instance, media 206 begins with some first resistivity characteristic at an ambient, or unwritten state. A first current is then applied to media 206, thereby heating media 206 to a first temperature. The first current is then removed from media 206, which thereby begins to cool. As media 206 cools, media 206 gains a second resistivity characteristic. In one embodiment, the second resistivity characteristic of media 206 can be measured more precisely than simply whether the second resistivity characteristic is different from the first resistivity characteristic. The second resistivity characteristic can vary depending on the temperature that the media 206 is heated to by the first current. Thus, the different resistivity characteristics that can be represented by the second resistivity characteristic can be representative of a range of data values. This range of data values can be classified in discrete ranges to represent analog values. Alternatively, the precise value of the resistivity characteristic for media 206 can be measured for more precise analog data storage. Measurements of the resistivity are preferentially obtained by taking measurements which are relative to a first state of the media, but can also be obtained by taking absolute value measurements. Another method of measurement extracts the data as the derivative of the measured data.

Media 206 can posses a large dynamic range for resistivity states, thereby allowing analog data storage. The dynamic range for the resistivity characteristic of media 206 can be approximately 1000-10,000 (or 10^3 to 10^4) orders of magnitude. In one embodiment, however, heating from the probe on the phase change material can cause only a very small area of media 206 to undergo a change in its resistivity. In this form a smaller dynamic range may be observed, as only a small region of the media is altered.

Figure 3:
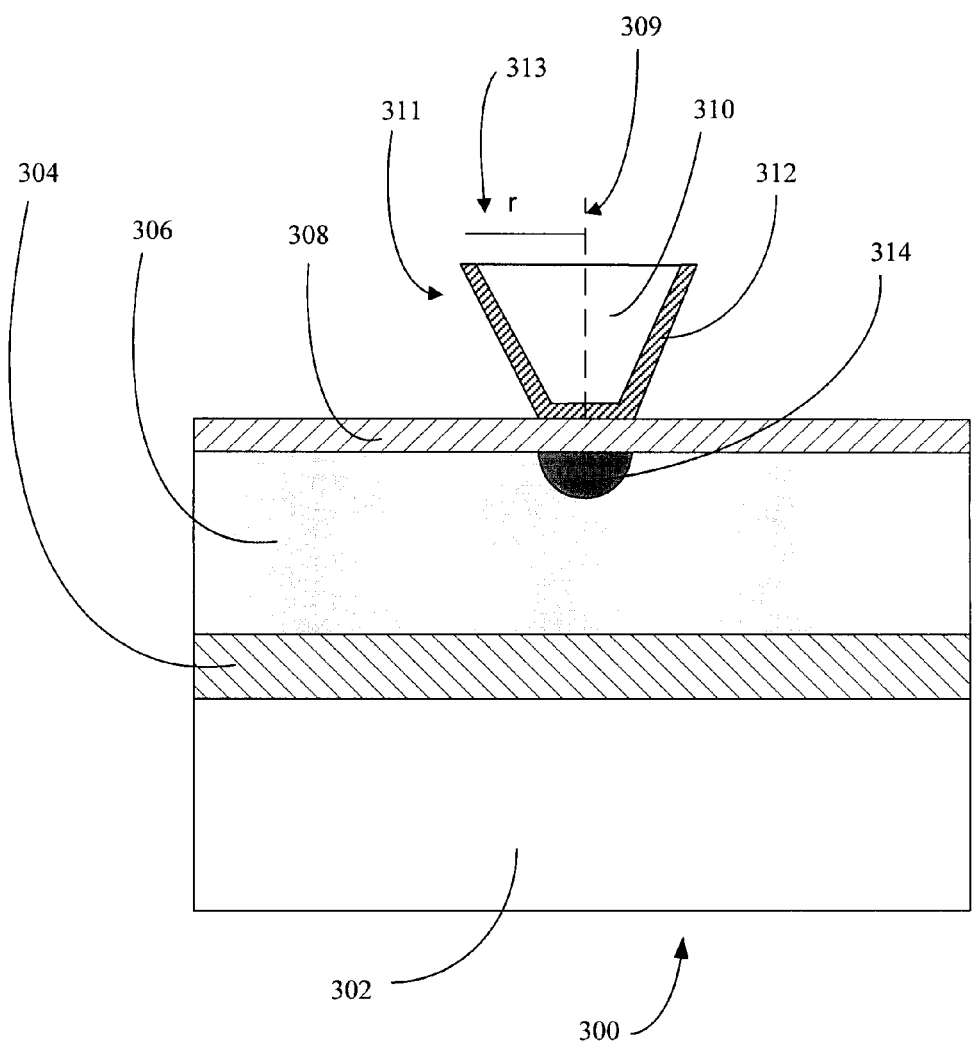
FIG. 3 is another embodiment of the invention that shows a cross-section of a media device including a data bit where an embodiment of a cantilever tip is connected with the media device.

FIG. 3 is another embodiment of the invention that shows a cross-section of the media device 300 including a data bit where an embodiment of an atomic probe 311 is in contact with the media device 300. Atomic probe 311 includes a core 310 and a coating 312. Media device 300 includes a substrate 302 connected with undercoat 304. Undercoat 304 of memory device 300 is connected with media 306. Media 306 includes a data bit 314. Media 306 and data bit 314 are connected with overcoat 308. Atomic probe 311 is in contact with overcoat 308. Memory device 300 can be any one of the embodiments described above in FIGS. 1 and 2.

One embodiment of the atomic probe 311 includes core 310 and coating 312 with a generally conical shape. For instance, atomic probe 311 has a generally conical shape, however, atomic probe 311 can also be described as having a generally trapezoidal shape. Atomic probe 311 can have a radius of curvature 313 from a few nanometers to as much as fifty nanometers or more. The radius of curvature 313 is measured from a line 309 generally extending down the center of the atomic probe 311. Atomic probe 311 is generally symmetrical along the line 309, but as will be seen below, atomic probe 311 is not limited to being symmetrical along the line 309.

In one embodiment, either to write a data bit 314 or read a data bit 314 to the memory device 300, the atomic probe 311 should make contact with the memory device 300. This contact can occur where atomic probe 311 contacts the overcoat 308 of the memory device 300. The point of contact on the atomic probe 311 is generally conductive. Thus, in one embodiment, the atomic probe 311 includes a core 310, which is an insulator, that is partially covered by a conductive coating 312. The coating 312 of atomic probe 311 makes contact with overcoat 308 of memory device 300 during access of memory device 300.

In another embodiment of the invention, during a read operation, atomic probe 311 does not have to make direct contact with overcoat 308 of memory device 300. Instead, atomic probe 311 is brought in close proximity with memory device 300 such that coating 312 can sense whether a piece of data 314 exists. For instance, if memory device 300 were of a charged storage type memory, then atomic probe 311 would sense the electric and/or magnetic field strength of data 314 through coating 312.

In one embodiment, the core 310 of atomic probe 311 can include oxides, amorphous silicon, or other insulators. The coating 312 of atomic probe 311 is a conductor and can include any number of different components. For instance, coating 312 can include titanium nitride, platinum, gold, aluminum, tungsten, tungsten carbide, tungsten oxide, diamond-like carbon, platinum iridium, copper, doped silicon or a mixture of such conductors. The choice of material for coating 312 of atomic probe 311 is influenced by the chosen application for the atomic probe 311. For instance, some applications require the coating 312 to be an exceptional conductor like platinum, while others do not require such a high conductivity. Titanium nitride can be used for coating 312 and would be beneficial if the application valued a hard coating 312 over a highly conductive coating 312.

One embodiment of the invention controls the shape of the coating 312 such that it is rectangular in shape. Thus, during a write function to the memory device 300, the data 314 formed will have a generally rectangular shape as opposed to a spherical shape.

Figure 4:
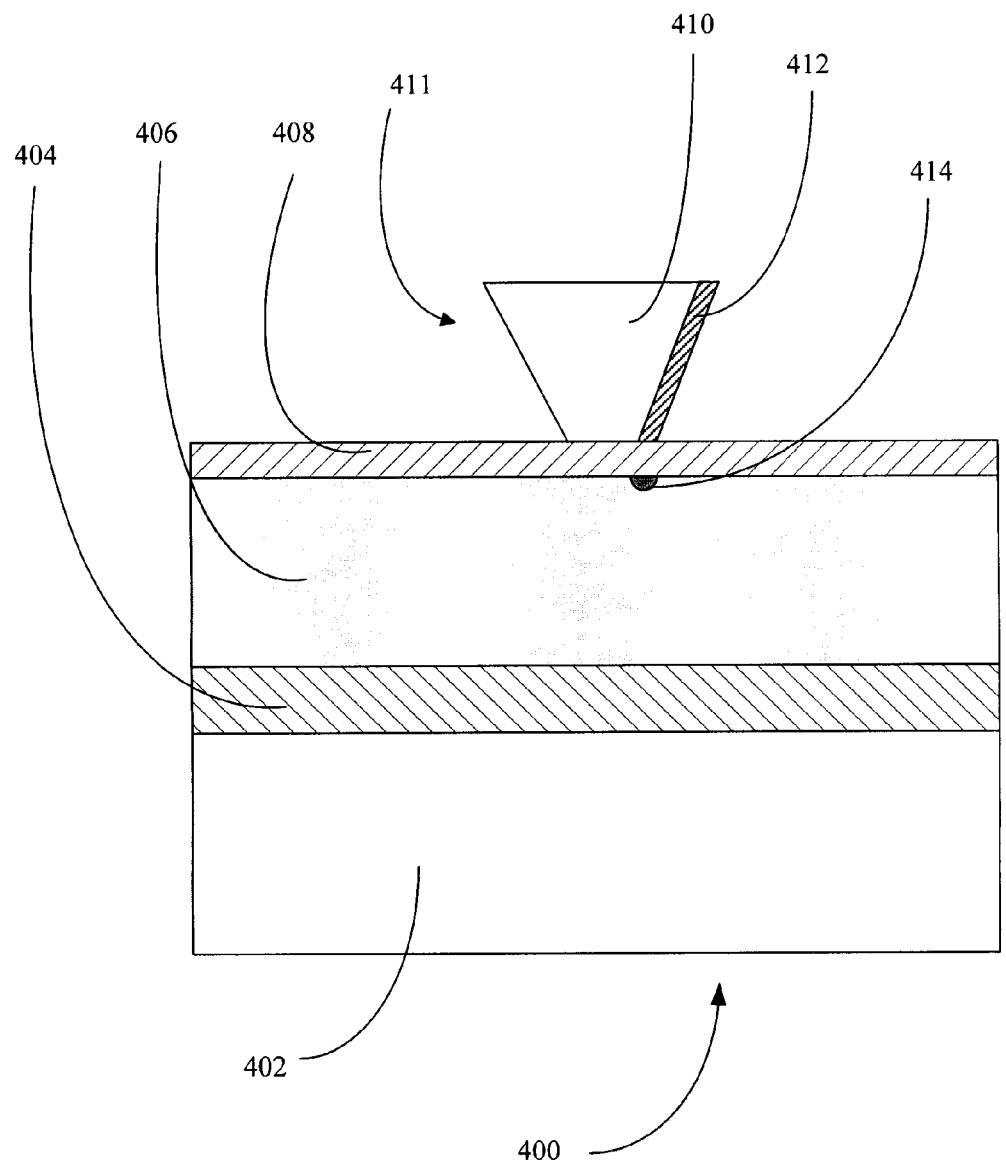
FIG. 4 is another embodiment of the invention that shows a cross-section of a media device including a data bit where another embodiment of another cantilever tip is connected with the media device.

FIG. 4 is another embodiment of the invention that shows a cross-section of the media including a data bit where another embodiment of another cantilever tip, or atomic probe 411, is connected with the media. Again, a media device 400 is shown that can be any of the memory devices previously discussed. Media device 400 includes a substrate 402, an undercoat 404, a media 406, and an overcoat 408. Media device 400, as shown, has been written to and a bit of data 414 formed. Atomic probe includes a core 410 connected with a coating 412.

Shown in FIG. 4, is an embodiment of the invention where the coating 412 of atomic probe 411 is only on one side of atomic probe 411. Thus, when atomic probe 411 makes contact with media device 400, a smaller portion of atomic probe 411 can potentially affect media device 400. For instance, during a write operation by the atomic probe 411 where media 400 is a phase change media, coating 412 provides a path for conducting a current through media device 400. The contact area of coating 412 is smaller than the contact area of coating 312 from FIG. 3. Thus, the amount of media 406 that can be influenced by a current flowing through coating 412 is less than the amount of media 306 that can be influenced by a current flowing through coating 312 from FIG. 3.

Figure 5A:
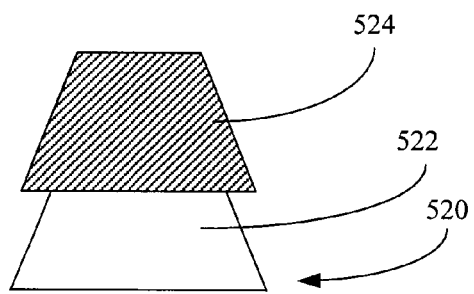
FIGS. 5A, 5B, and 5C depict another embodiment of the invention showing another atomic probe with a coating on five sides of a core.
Figure 5B:
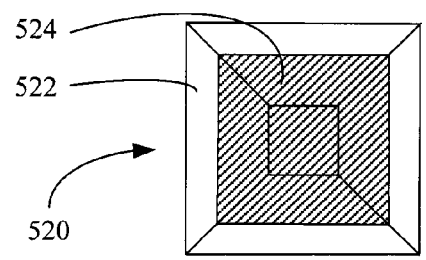
Figure 5C:
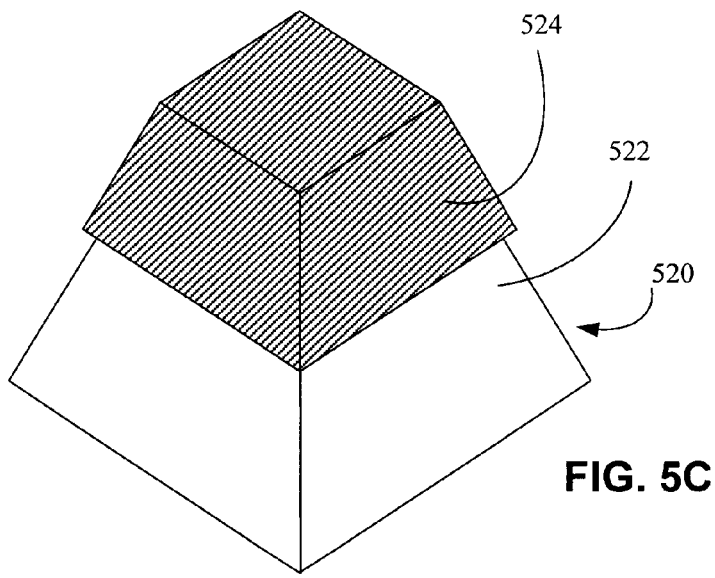

FIGS. 5A, 5B, and 5C depict another embodiment of the invention showing another atomic probe 520 with a coating 524 on five sides of a core 522. FIG. 5 shows three views of atomic probe 520. FIG. 5A is a side view of atomic probe 520 where coating 524 is connected with core 522. As can be seen in FIG. 5A, coating 524 covers an entire side of atomic probe 520. FIG. 5B is a top view of atomic probe 520. FIG. 5B shows that the coating 524 protects the core 522 along five surfaces. The center square portion of FIG. 5B is the area that makes contact with a media device. One such media device can be similar to media device 300 of FIG. 3. FIG. 5C shows a three dimensional view of atomic probe 520. As can be seen from FIG. 5C, coating 524 extends away from core 522.

FIGS. 6A, 6B, and 6C depict another embodiment of the invention showing another atomic probe 620 with a coating 624 on one side of a core 622. FIG. 6 shows three views of atomic probe 620. FIG. 6A is a side view of atomic probe 620 where coating 624 is connected with core 622. Coating 624 is only on one side of core 622 in FIG. 6. Also, coating 624 extends past the tip 623 of core 622 or may be even with the end of core 622. Thus, as the atomic probe 620 is brought into contact with a media device, coating 624 will make contact with the media device. FIG. 6B shows a top view of atomic probe 620 and FIG. 6C shows a three dimensional view of atomic probe 620 with the coating 624 only on one side of core 622.

In an alternative embodiment, coating 624 can be flush with the tip 623 of core 622 similar to the atomic probe 411 shown in FIG. 4.

In another embodiment of the invention, the coating 634 of FIG. 6D does not rest to the side of core 642, as shown in FIG. 6A, but rather, coating 634 is embedded into core 642. An example of this would be applying a preferential doping to one side of a single crystal silicon core, causing the embedded area to be conductive, while the core would remain substantially an insulator.

Figure 7A:
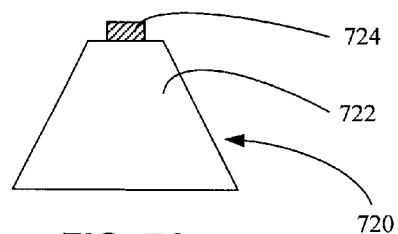
FIGS. 7A, 7B, and 7C depict another embodiment of the invention showing another atomic probe with a coating formed on the end of a core.
Figure 7B:
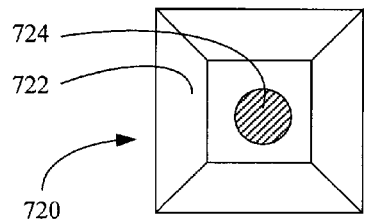
Figure 7C:
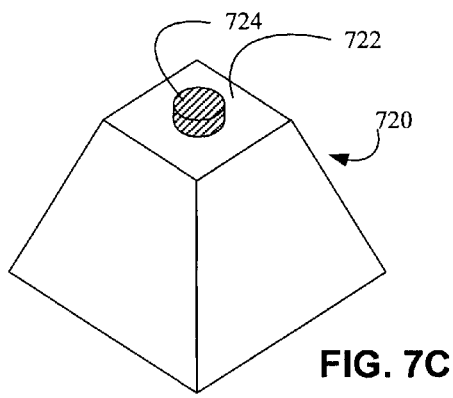

FIGS. 7A, 7B and 7C depict another embodiment of the invention showing another atomic probe 720 with a coating 724 formed on the end of a core 722. In the embodiment of the invention shown in FIG. 7, coating 724 is has a generally button like shape. Unlike the embodiments of the invention shown in FIGS. 5C and 6C, the coating 724 in FIG. 7C has a generally cylindrical shape. FIG. 7B shows a top view of atomic probe 720 and FIG. 7C shows a three dimensional view of atomic probe 720.

The material used for coating 724 can be any of the materials previously disclosed. In an alternative embodiment, however, coating 724 can include carbon nano-tubes. Carbon nano-tubes are useful because they are very small with known dimensions. Thus, the cross-section of a carbon nano-tube is very small. Furthermore, carbon nano-tubes are very strong, thus they can provide the hardness needed for extended life of an atomic probe. Moreover, the structural make-up of a carbon nano-tube coating is capable of handling temperatures well in excess of 600° C.

Figure 7D:
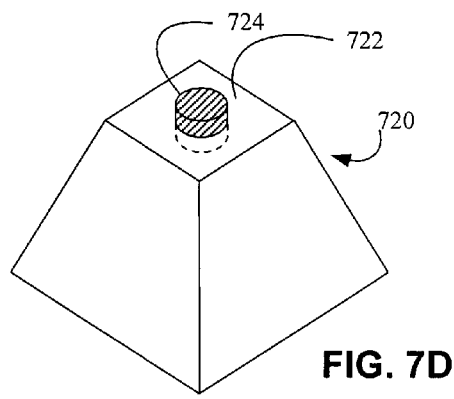
FIG. 7D depicts yet another embodiment of the invention.

In another embodiment of the invention, the coating 734 of FIG. 7D does not rest top of core 742, as shown in FIG. 7, but rather, coating 734 is embedded into core 742.

In these embodiments the core is conductive, or the core is coated with a conductive coating, such that a conductive path exists between the carbon nanotube and the probe. There also exists a conductive path to the cantilever conductor on which the atomic probe sits.

Figure 8A:
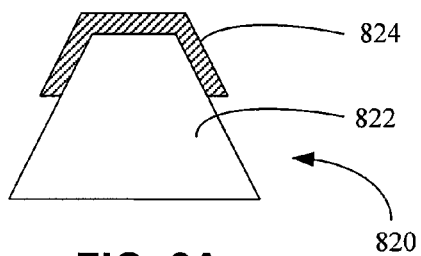
FIGS. 8A, 8B, and 8C depict another embodiment of the invention showing another atomic probe with a coating banded on a core.
Figure 8B:
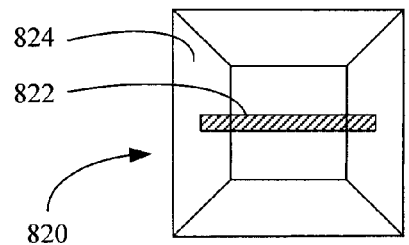
Figure 8C:
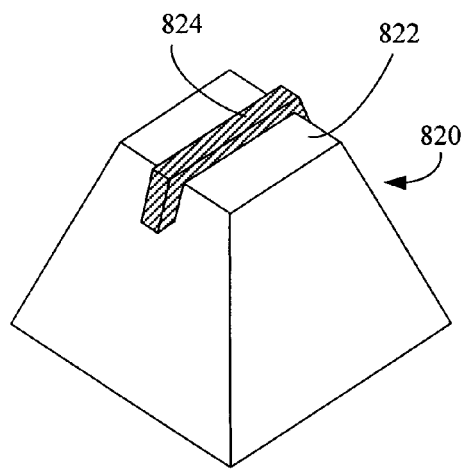
Figure 8D:
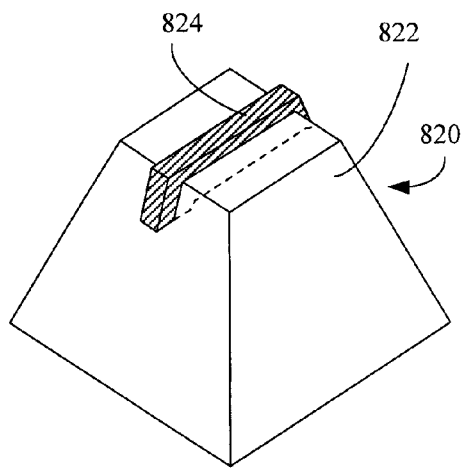
FIG. 8D depicts yet another embodiment of the invention.

FIGS. 8A, 8B, and 8C depict another embodiment of the invention showing another atomic probe 820 with a coating 822 banded on a core 824. FIG. 8A shows coating 824 draped over the core 822 of atomic probe 820. FIG. 8B shows how coating 824 is a thin piece of material relative to the dimensions of the core 822. FIG. 8C is a three dimensional view of atomic probe 820 showing how the coating 824 is draped over core 822. In another embodiment, FIG. 8D, coating 834 is also recessed into core 842. The reduced contact area of coating 824, or coating 834, shrinks the affected media, of a media device, when signals are passed through the coating 824, or the coating 834, contact is made with a media device by the coating 824, or the coating 834. Thus, during a write operation, less media is influenced by the atomic probe 820. Consequentially, more data can be stored in a media device than if a coating 824, or coating 834, with a larger contact surface were used.

FIGS. 9A, 9B and 9C depict another embodiment of the invention showing another atomic probe 920 with a coating 924 on one side of a core 922, where coating 924 has a protective material 926 connected with it. FIG. 9A shows a side view of atomic probe 920. Core 922 is connected with coating 924. Coating 924 is also connected with a protective material 926. FIG. 9B shows a top view of atomic probe 920 and FIG. 9C shows a three dimensional view of atomic probe 920.

As atomic probe 920 makes contact with a media device, the atomic probe 920 can be dragged or pushed along the media device. Such actions can cause mechanical stresses on the atomic probe 920, and coating 924 in particular. The addition of protective material 926 gives additional support to coating 924, reducing the chance of coating 924 suffering damage due to contact with the media device.

Figure 10:
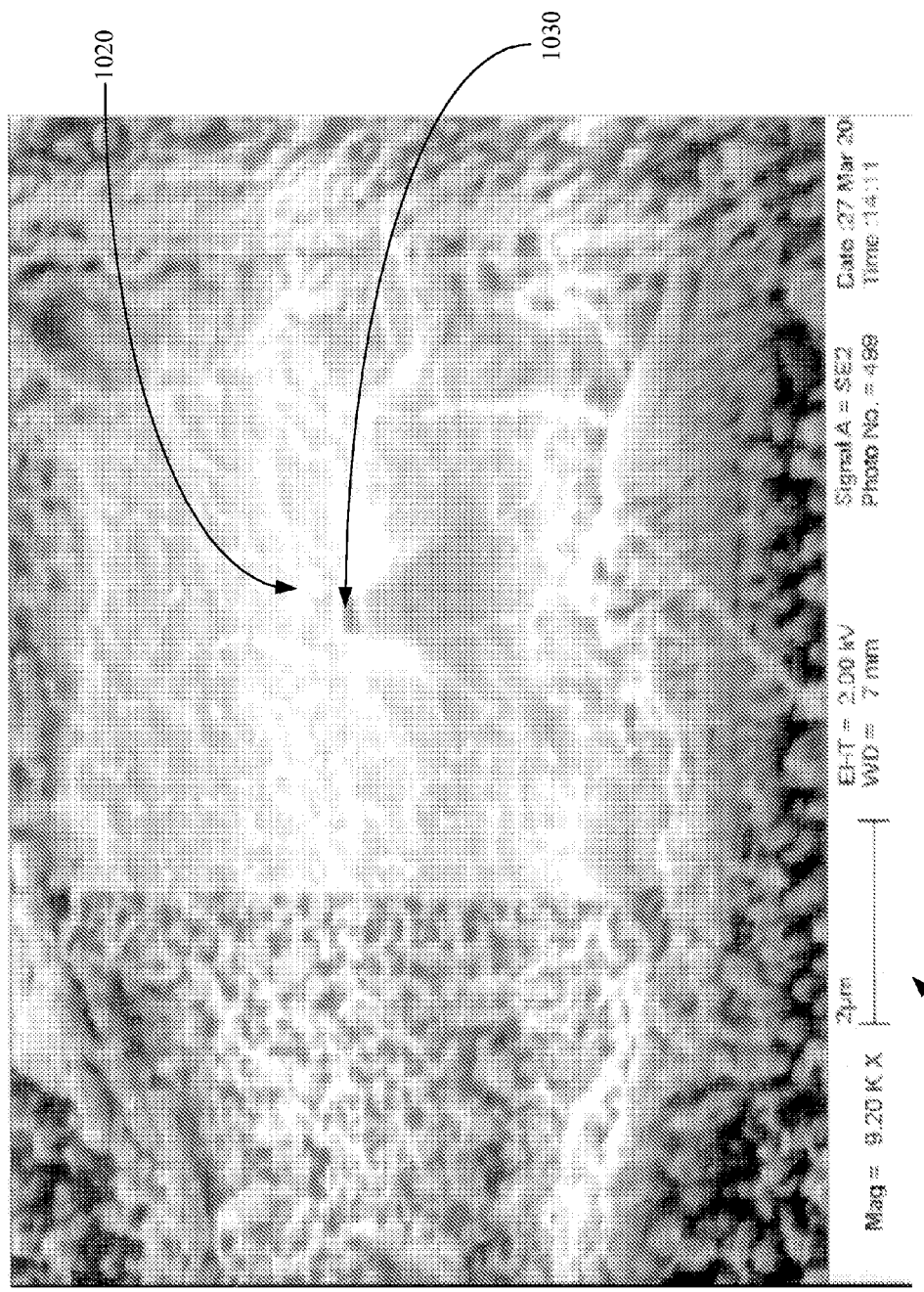
FIG. 10 is a scanning electron microscope view of another embodiment of the invention showing another atomic probe with a coating.

FIG. 10 is a scanning electron microscope view of another embodiment of the invention showing another atomic probe. As can be seen from FIG. 10, an atomic probe 1020 is shown with a tip 1030. The diameter of the base of the atomic probe 1020 is less than two micrometers as can be seen by the scale 1032.

The foregoing description of the present invention have been presented for purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A system for storing data, the system comprising:
    a memory device having a media for storing data;
    a probe electrically connectable with the memory device, the probe including:
    a core formed from of an insulator, and
    a coating formed of a conductor, the coating being disposed over at least a portion of the core;
    wherein the coating communicates electrically with the media to perform one of a read and a write in the media;
    wherein the media has two or more ranges of electrical resistivity to represent one or more data.

2. The system of claim 1, wherein when a current is applied between the probe and the memory device, an electrical resistivity within one of the two or more ranges of electrical resistivity can be provided to a portion of the media.

3. The system of claim 1, wherein the probe is electrically connected with the memory device when the probe contacts the memory device.

4. The system of claim 1, wherein the media is a phase change material.

* * * * *